United States Patent
Maiaro

[15] 3,656,656
[45] Apr. 18, 1972

[54] CYLINDER POSITIONER

[72] Inventor: Richard Joseph Maiaro, Yonkers, N.Y.

[73] Assignee: Ventech Automation Company, Inc., Garnerville, N.Y.

[22] Filed: Jan. 18, 1971

[21] Appl. No.: 107,326

[52] U.S. Cl. ........................ 221/173, 193/43 C, 198/33 AA
[51] Int. Cl. ........................................................... B23q 7/12
[58] Field of Search .............. 198/33 AA; 193/43 B, 43 C, 193/43 D; 221/171, 173

[56] References Cited

UNITED STATES PATENTS 2,570,903  10/1951  Yost ................................. 193/43 B Primary Examiner—Edward A. Sroka
Attorney—Polachek & Saulsbury

[57] ABSTRACT

A high speed positioner for cylindrically or conical-shaped objects; such as pen caps, barrels, lip stick shells, flashlights or ammunition shells, which will orient and feed the elements supplied from a hopper, with one of the ends of the elements being pointed in a selected direction. A sensing device is provided on the feed bar to select one of the ends of the elements to be pointed downwardly in advance of the other end of the element into an orienting chamber for delivery to a vertically extending discharge chute. Other sensing devices and micro switches are provided in the positioner to control the operation of solenoid-operated air cylinder devices and air injectors used in positioning the work cylinder elements. The passing of the cylinder elements through the orienting chamber and the delivery tube can be observed through a transparent door closed thereover. A safety door at the bottom of the vertical chute is automatically opened to prevent a jamming of the cylinder elements at the lower end of the delivery chute, and by which access can be had to the chute, and by which a faulty element can be removed prior to being ejected from the lower end of the chute onto a pin or between jaws of a rotating table of machine on which work is to be performed by the machine upon the cylinder element.

10 Claims, 13 Drawing Figures

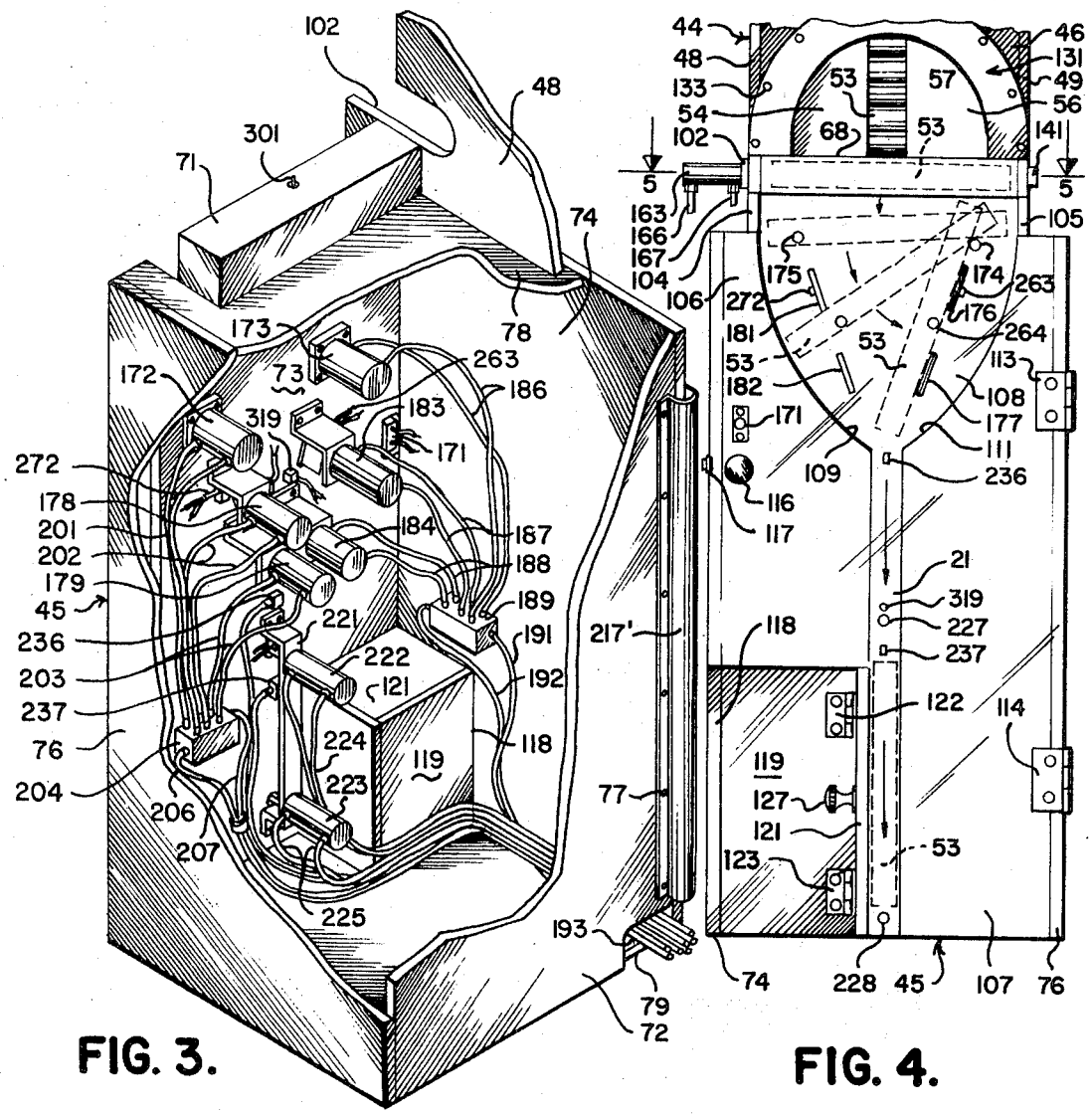
FIG. 3.
FIG. 4.
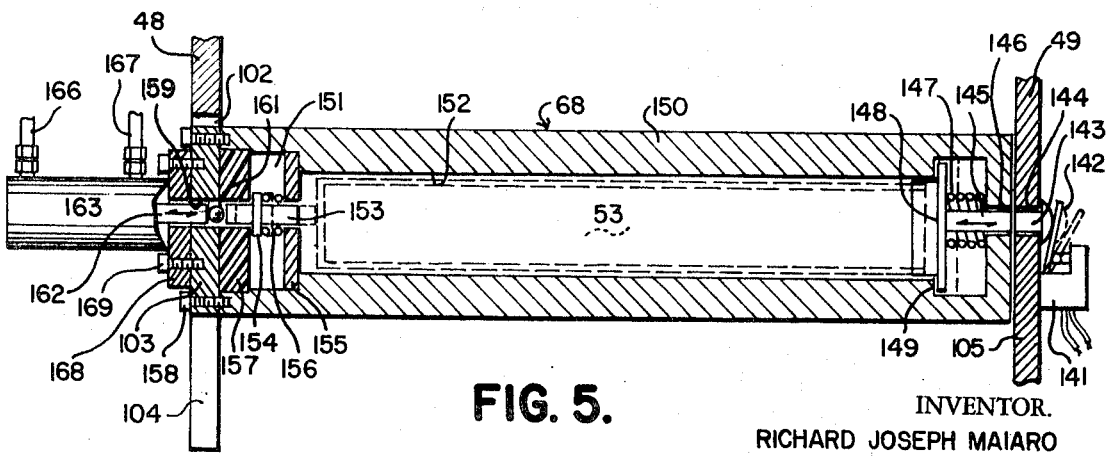
FIG. 5.
INVENTOR.
RICHARD JOSEPH MAIARO
BY Polachek & Saulsbury
ATTORNEYS

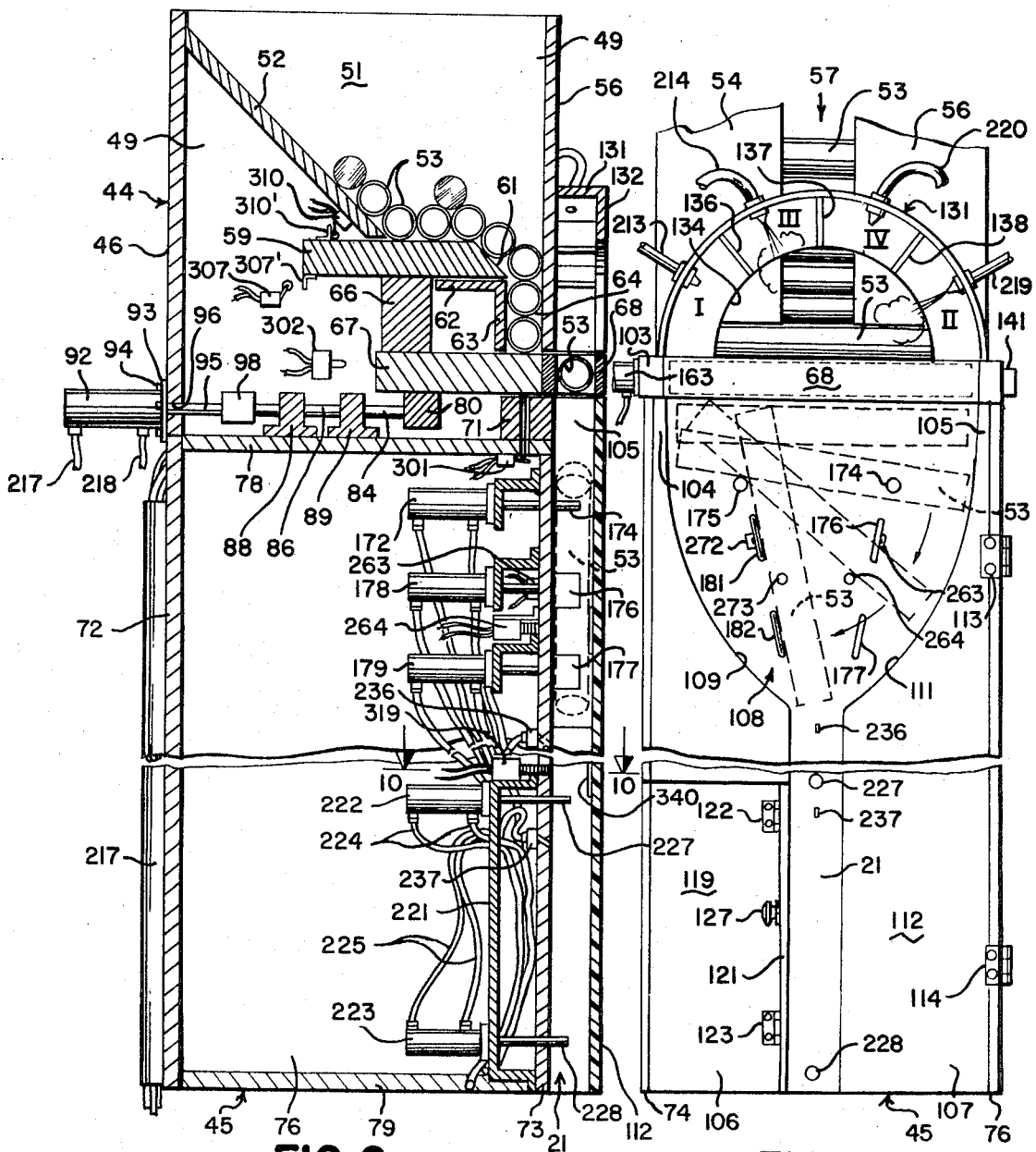
FIG. 6.
FIG. 7.
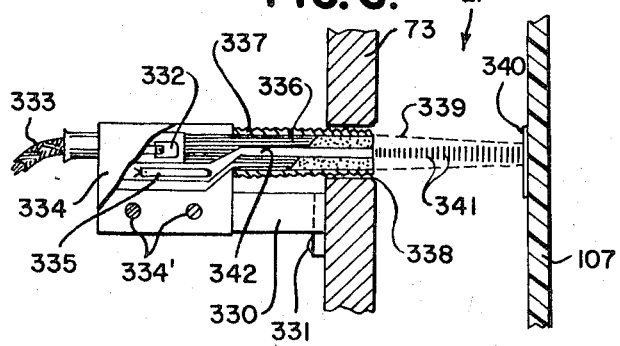
FIG. 10.
INVENTOR.
RICHARD JOSEPH MAIARO
BY
Polachek & Saulsbury
ATTORNEYS

FIG. II.

CYLINDER POSITIONER

This invention relates to a cylinder positioner for cylindrically or conical shaped parts to effect the positioning of the parts for presentation to a work table.

It is a principal object of the present invention to provide a cylinder positioner which will orient one of the ends of an element in a selected direction, and which will be operated at high speeds utilizing air blown down jets as well as gravity to effect a high rate of delivery of the element in proper position for ejection onto work-receiving members of a high speed, continuous, or index-moving, rotating work table.

It is another object of the invention to provide a high speed cylinder positioner in which the location of the parts are sensed at all stations through the device so as to prevent any jamming of the cylinder elements, one upon the other, during the passage of the same through the positioner.

It is still another object of the invention to provide a cylinder positioner for effecting a high speed delivery of the cylinders in which at all stations of movement of the cylinders through the positioner, this movement can be observed through a transparent door overlying the chamber and the delivery chute, and upon being open permit access for cleaning and lubrication purposes and removal of any foreign particles that may be passed with the cylinders through the machine.

It is a further object of the invention to provide a cylinder positioner having a hopper device which is top loaded, an agitating plate operated with the operation of the feed bar in which sensing of the position of the work cylinder piece in the feed bar opening is made by devices carried by the feed bar and wherein such devices will serve to automatically position right or left guide members thrust into the orienting space and the operation of air jets for effecting first the positioning of the cylinder in the orienting space and then the ejecting of the cylinder from the orienting space into the vertical delivery chute and from the delivery chute to the work-performing machine, the work-performing machine having the initial starting switch for the positioner apparatus so that it works in time relationship with the rotation of the work-receiving table.

Other objects of the invention are to provide a high speed cylinder positioner, which is compact, of simple construction, light in weight, easy to mount on a work machine, requires little maintenance, automatic in operation, efficient and effective in use.

Reference may be had to the following detailed description taken in connection with the accompanying drawing, in which:

FIG. 1 is a side and front perspective view of the cylinder positioning apparatus embodying the features of the present invention, this apparatus overlying a rotating table with work-receiving pins adapted to be positioned under the apparatus to receive the cylinder elements to carry them pass a work-performing station, not shown, and serving to engage a sequence starting micro-switch positioned on a base for engagement of its actuating arm by the pins as they are advanced past the micro-switch.

FIG. 3 is a rear perspective view of the bottom orienting section of the cylinder positioning apparatus with walls of the same broken away to show the arrangement of the several fluid and micro-switches disposed upon the rear surface of the front wall of the apparatus.

FIG. 4 is a front elevational view of the apparatus with the transparent door closed upon the cylinder positioning or orienting chamber and with illustration being made of the manner in which the cylinders are positioned from horizontal position to a vertical position against right stop bars therein and endwise delivery into a vertical chute space.

FIG. 5 is an enlarged transverse sectional view taken on line 5—5 of FIG. 4 with the cylinder element positioned in axial alignment with an end micro-switch and a fluid-operated sensing pin device to determine which end of the cylinder element is to be dropped first for alignment with passage into the vertical delivery chute.

FIG. 6 is a vertical sectional view of the cylinder-positioning apparatus looking in elevation into the hopper from which the cylinder work elements are picked up by the feed plate bar and to the various fluid and electrical control devices that control the passage of the cylinder element through the positioning space and into the vertical delivery chute.

FIG. 7 is a fragmentary front elevational view similar to FIG. 4 illustrating the manner in which the cylinder work element is turned to the left and upon the several air jets and stop pins that serve to work upon the element to effect the turning of the same as sensed by the feed bar micro-switch.

FIGS. 8 and 9 are respectively illustrative plan views of the cylinder turn table having work-receiving pins adapted to be aligned with the lower end of the vertical delivery chute and with illustration being made of the manner in which pins trigger the starting micro-switch to start the sequential operation of the several devices that control the positioning and feeding of the cylinder element for delivery to the table work-receiving jaws.

FIG. 10 is a fragmentary vertical sectional view of one of the light beam sensing devices that is extended across the orientation chamber vertical chute for timing the dropping of the work elements downwardly therethrough.

Figure 11:
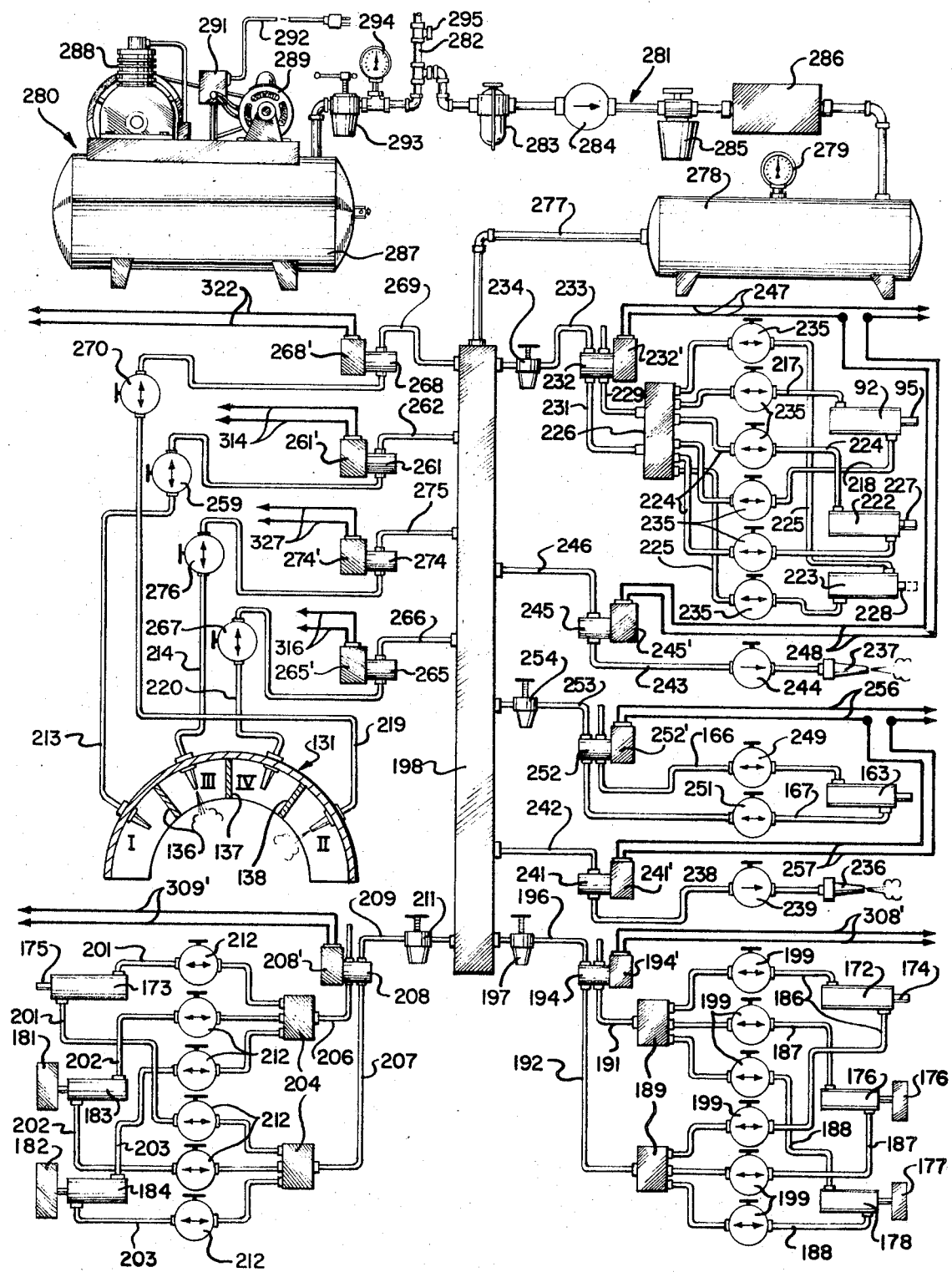

FIG. 11 is a diagrammatic layout view of the compressed air system for the air jets and fluid-actuated devices for effecting the controls of the various elements thrust into the path of movement of the cylinder work elements and of the various solenoid-operated valves and controlling the passage of air as well as the several air pressure regulators in the various branch control lines.

Figure 12:
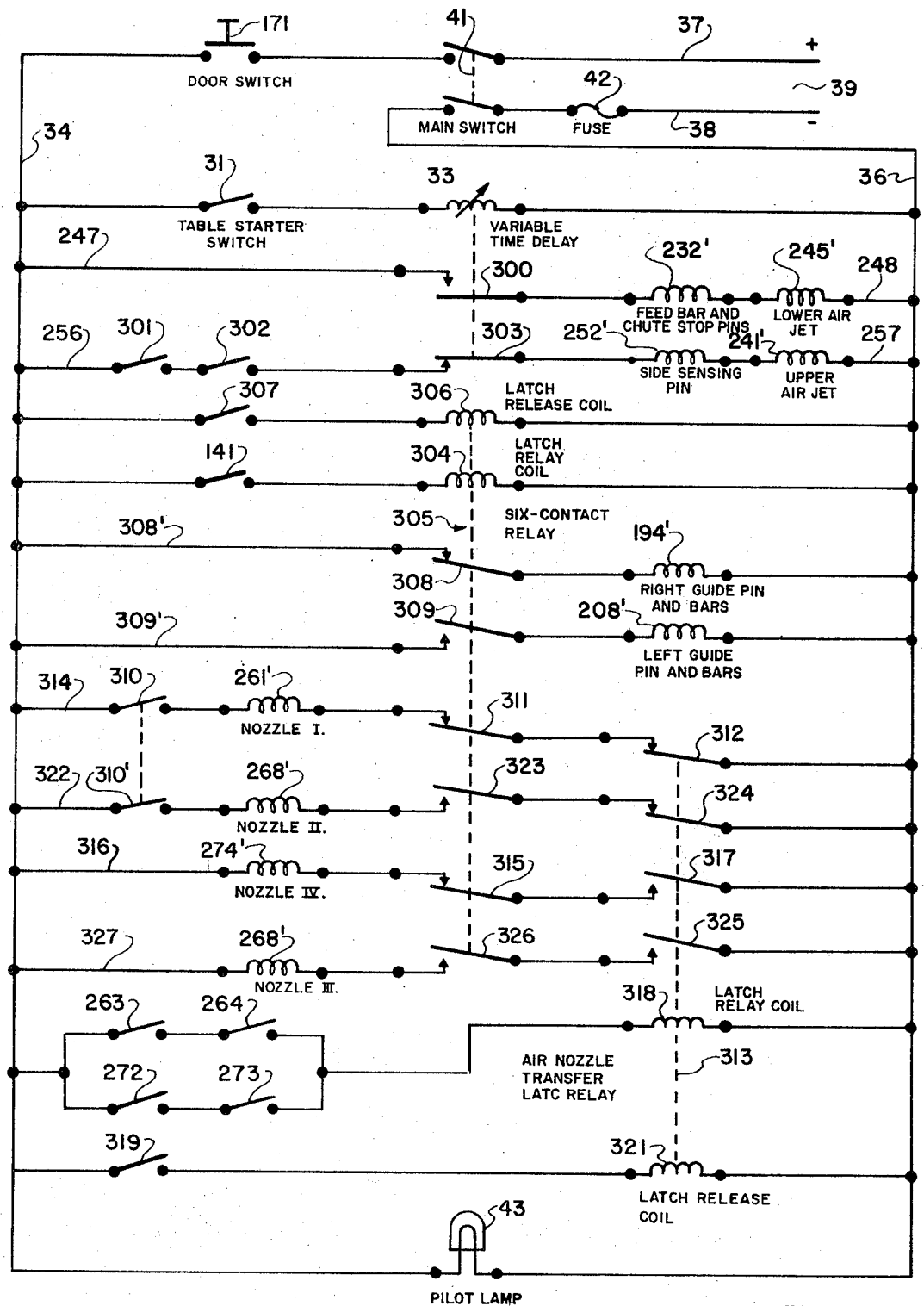
Figure 13:
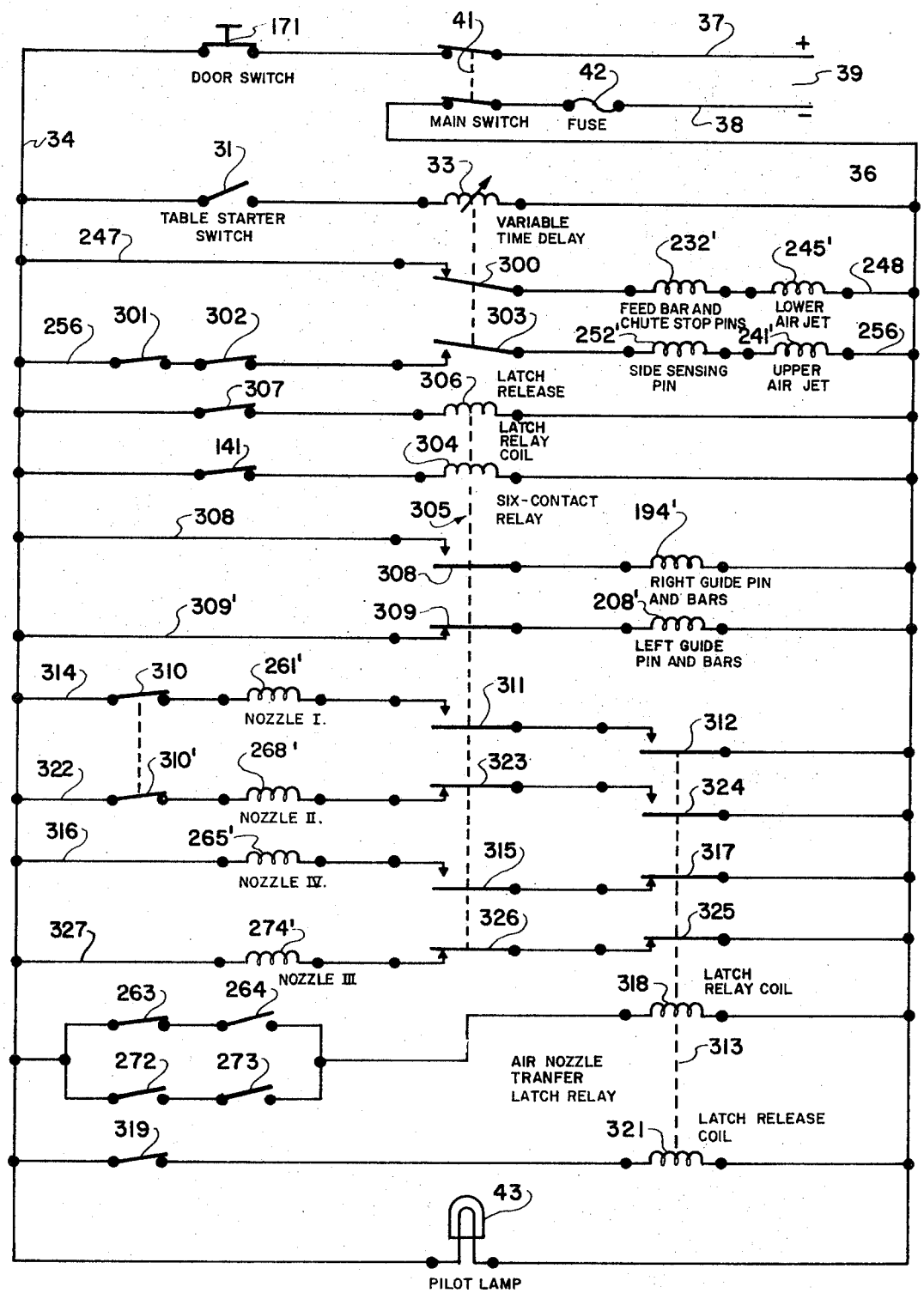

FIGS. 12 and 13 are line wire diagrams of the electrical control elements for the fluid-operating cylinders and the air jets, the FIG. 12 showing position of switch when sensing pin enters free end of work cylinder and FIG. 13 when pin engages closed end.

Figure 1:
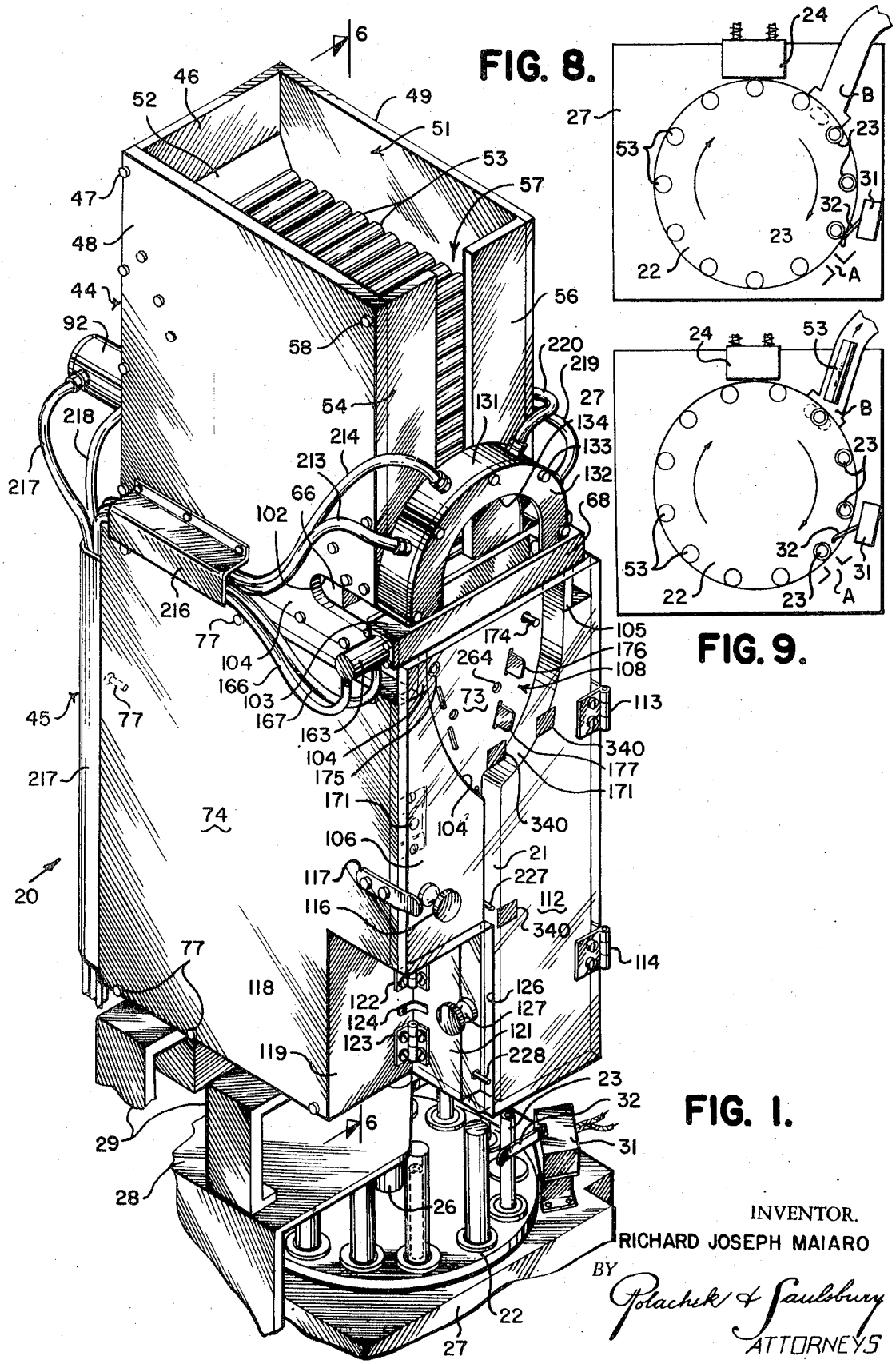

Referring now to the drawing, 20 represents generally the cylinder positioning apparatus embodying the features of the present invention and serving to orient and feed hollow cylinder-shaped, barrel-like workpieces, conical-shaped objects, or elements from horizontal delivery from a hopper to vertical and axial flow downwardly through a drop delivery space or chute 21 in proper and timed relationship to and work gathering apparatus such as a rotatable work table 22 having work-receiving posts 23 mounted about the periphery thereof at equally spaced circumferential distances thereapart and rotates in a continuous or step-by-step movement to advance the workpiece to any kind of a work station such as an engraving apparatus 24. The proper end of the work cylinder will always be presented to work-receiving posts, 23, the workpieces having been positioned by the present apparatus to have their open ends down. Instead of posts that receive the open ends of the cylinder pieces the table 22 may have open and closing jaws and the apparatus arranged to deliver closed ends first down the delivery chute 21. The table 22 is rotated with its vertical axle shaft 26 that supports the table 22 on a stationary base 27 and which has extending upwardly from and over the base 27 a cover plate 28 for receiving the shaft 26 at its upper end and which serves as a support for the mounting of the present cylinder positioning apparatus 20 by elevated spaced brackets 29 upstanding from the cover plate 28, all as best seen in FIGS. 1, 8 and 9.

Mounted upon the table support 27 at one corner thereof is a cycle starter micro-switch 31 which starts the cycle of operation of the cylinder positioning apparatus 20. This switch 31 has a laterally extending pivoted feeler finger 32 that engages a leading free work-receiving post 23 when the table 22 is rotated in the direction of the arrows as indicated in the drawings, FIGS. 8 and 9, and is pivoted outwardly by the aid of the post as shown in FIG. 8 as the post 23 approaches its work-receiving station A, whereupon the finger 32 will return to its innermost position to be engaged by the next work-receiving pin 23 with the rotation of the table 22. Within feed speeds and the adjustments available to regulate the same all of which will be apparent as the description proceeds, the table 22 may have continuous rotation. After the workpieces have been engraved the spring pressed engraver 24 and moved beyond toward the starter switch 31 they will be discharged by air at a discharge station B in a manner to be described and thereby completing the cycle of operation of the work-performing apparatus for which the present apparatus 21 serves as a feeder and wherein for itself is an end for end work cylinder positioning or orienting apparatus as well as being an axial down feeder.

This starting micro-switch 31 is wired as shown into the circuitry of FIGS. 12 and 13 and lies in series with a variable time delay operating coil 33 and both the switch and time delay coil extending between common parallel line wires 34 and 36 that are supplied with electric current by supply wires 37 and 38 from an electric source 39 through a double-pole, single-throw main switch 41 having a fuse 42 of amperage dependent upon the electrical load of the work circuit and to have designation as to whether or not the power is "on" or "off", a pilot lamp 43 that would glow when the current is "on" is connected across the line wires 34 and 36 and may be located upon the main switch 41. A further description of the wiring diagram will be made when a description of the mechanical construction of the cylinder positioning apparatus 20 has been made.

This cylinder positioning apparatus 20 comprises generally a top hopper section 44 supported upon a bottom work cylinder orienting section 45. The top hopper section has a rear wall 46 to which there is connected by bolts 47 forwardly extending and parallel side walls 48 and 49. The upper ends of the assembled walls 46, 48 and 49 are open to provide a hopper space 51 and extending forwardly and downwardly from the rear wall 46 is an inclined hopper member 52 serving to move forwardly hollow cylinders or workpieces 53, open at one end and closed at the other end, such as cartridge shells, pen caps, pen barrels and numerous other cylindrically shaped members, or conical-shaped objects and when assembled in the hopper space 51 may have their open ends and closed ends extending in different directions from one another and which need to be positioned or oriented by this present positioning and feeding apparatus and always delivered vertically and axially with either the open end or the closed ends down to a rotating table 22 of a work-performing apparatus.

The forward face of the hopper section 44 of the apparatus is partially closed by opposing inwardly extending parallel left and right front pieces 54 and 56 separated at their inner edges to provide access space 57 to the hopper space 51 as through which an operators fingers can be extended to condition the cylinder elements 53 for proper delivery from the bottom of the hopper space 51 and to straighten out any angled pieces 53 not tending to flow properly therethrough. These vertical front pieces 54 and 56 are secured respectively to the forward edges of the side panels 48 and 49 by fastening screws 58.

Within the hopper space 51 and lying immediately below the lower end of inclined plate 52 is a horizontally movable agitating and straightening plate 59 having an inclined forward edge 61 and slidable over a transversely extending shelf 62 of angle section from which depends a vertical guide apron 63 at its forward end that in cooperation with the spaced front plates 54 and 56 provide for a vertical passageway 64 into which the parallel aligned cylinders 53 are delivered from the hopper space 51 by lateral working of the agitating plate 59. Depending from and fixed to the underface of the agitating plate 59 by fastening screws 65, is a drive member 66 that fixedly connects with the top of a lower and more forwardly extending cylinder feed plate 67 which are moved and worked together by a double acting air cylinder in a manner to be described.

The forward face of the lower feed member 67 carries a cylinder pickup casing or bar 68 that is secured thereto by fastening screws 69 entering openings 70 on the forward face of the cylinder feed plate 67. This cylinder pickup bar 68 is open at the top to receive a cylinder piece 53 when aligned with the bottom end of the hopper vertical passageway 64, and this cylinder is held against passing through the bottom opening of the pickup feed bar 68 by being stopped by the top surface of a transversely extending block 71. This elongated transversely extending stop block 71 is connected to and extends upwardly from a bottom orienting section 45 of the cylinder positioning apparatus 20 that supports the top hopper section 44 which has just been described.

The bottom and orienting section 45 of the cylinder positioning and feed apparatus 20 houses the various controls for the drop chute 21 and has substantially the same transverse section as the top hopper section 44 that is supported on the top thereof with its respective rear and front walls 72 and 73 run vertically coextensively with the rear and front walls of the top section 44. This bottom section 45 has two opposite side walls 74 and 76 that are directly secured by fastening screws 77 to rear and front walls 72 and 73 and a top wall 78 and a bottom wall 79 that rests upon the elevated brackets 29 carried on the machine cover plate 20 in such a manner as to align the vertically extending delivery chute 21 with the work-receiving posts 23 on the rotating table 22. The top wall 78 of bottom section 45 to which the transversely extending stop block 71 is connected, this block 71 serving as a stop for the downward movement of the work cylinders or barrels 53 from the hopper passageway 64 and cylinder pickup 68.

A feeder block 80 corresponding generally in shape and transverse length to the stop block 71 depends from and is fixed by fastening screws 81 entering vertical screw holes 82 of the depending block 80 and 83 of the bottom feed plate 67 and to this transverse block 80 there is connected forwardly extending parallel threaded connecting rods 84 and 85 that run through guide sleeves 86 and 87 held between longitudinally spaced transversely extending blocks 88 and 89 that are fixed to the top 78 of the bottom section 45. The forward ends of the rods 84 and 85 threaded into holes 91 in the lower feeder plate depending block 80 and thus rigidly secured thereto so that as the rods 84 and 85 are worked through the sleeves 86 and 87 the hopper feeder assembly including the upper and lower feeder plates 59 and 67 will be worked to deliver work cylinders to the open feeder bar 68.

Figure 2:
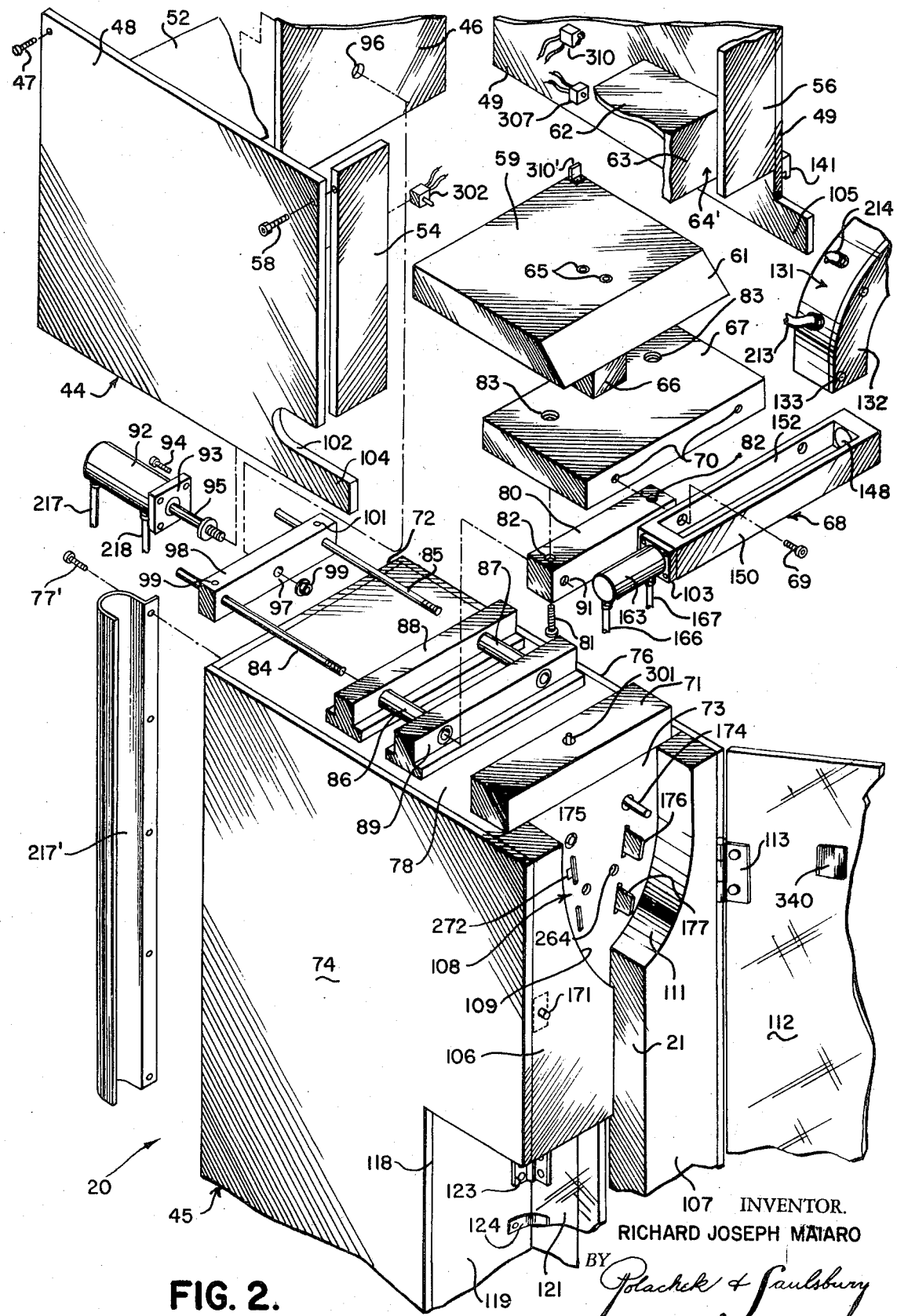
FIG. 2 is a fragmentary and exploded view of the cylinder positioning apparatus with the parts of both the hopper and orientation sections shown in detail and lifted from one another.

Mounted on the rear wall 46 of the top hopper section 44 is a two-way pneumatic air cylinder 92 by its flange plate 93 and fastening screws 94, FIG. 6, and its piston rod 95 extends forwardly through a hole 96 in rear wall 46 and hopper section 44 and is fixed by its threaded end in a hole 97 to a transversely extending tie bar 98 by a nut 99 and to which the connecting rods 84 and 85 are longitudinally adjustably connected by set screws 99 and 101, FIG. 2.

The forward edge of the hopper side wall 48 is cut rearwardly to provide a guide notch 102 in which a laterally projected end plate 103 of the transverse feeder bar 68 can slide. The lower edge of the guide notch 102 projects forwardly from the upper edge of the notch and the front edge of the wall 48 to provide a projected extension 104 of the side plate 48 of the distance about equal to the longitudinal thickness of the cylinder feed delivery bar 68, FIG. 6. The side wall 49 while not being notched is provided with a similar bottom extension 105 on its forward edge to enclose the opposite end of the bar 68. The drop stop block 71 on which the work cylinders 53 drop, lies within the side edge extensions 104 and 105 and flush within their upper edges. Since the cylinder delivery bar 68 rides over the top surface of the stop block 71 and forwardly outwardly therefrom when being worked by the feeder piston 92, the projections 104 and 105 will serve as closure means immediately below the cylinders delivery bar 68 when extended to its forward position to discharge the work cylinder 53 which it has carried to this position.

Extending vertically from the bottom wall 79 of the bottom section 45, is the upstanding front wall 73 that extends to the top wall 78 and lying inwardly of the forward edges of the side panels 74 and 76 of the bottom section 72. Lying flush with the inner sides face of the forward edges of the side panels 74 and 76 and of substantial thickness and constituting the front face of the bottom section 45 are two opposing relatively thick guide members 106 and 107 spaced apart centrally of the front of the bottom section 45 to provide for the vertically extending cylinder delivery chute 21 and being cut away above the delivery space 21 to provide an enlarged orientation space 108 into which the work cylinders 53 are dropped and tilted from the horizontal position from which they are discharged from the bar 68 to align the proper ends of the work cylinders 53 for their passage through the vertical delivery space or chute 21. The opposing side walls of the guide members 106 and 107 are respectively symmetrically curved as indicated at 109 and 111 upon the running from the top end of the pieces where the spacing is wide at the top and dropping in an oppositely curved and tapering manner or in funnel-like fashion toward the sides of the vertical delivery space 21.

A transparent door 112 is hingedly connected by vertically spaced hinges 113 and 114 to the forward edge of the side panel 76 of the bottom section 45 and can be opened by a pull knob 116 against the action of a spring latch 117 secured to the opposite side wall 74 of the bottom section. This door 112 being transparent permits one to observe the movement of the workpieces and provides quick and easy access to the orienting space 108 and the vertical delivery passage 21, when needed.

The side wall 74 is cutaway at its bottom end as indicated at 118 and closed by a small front wall 119 and a small bottom safety side door 121 is hingedly connected by hinges 122 and 123 to the small wall 119 and normally urged by a leaf spring 124 connected to the small wall 119 to a closed position to overlie a part of the vertical passage 21 and provide a part of one side wall thereof at its lower end and lie within the main door 112 which itself is cutaway at 126 toward the vertical passage 21 in order to permit access to the small door 121. This small door 121 will open when jamming takes place in the delivery passage 21 to eject a workpiece therefrom. This small safety door 121 is also transparent to permit further observation of the workpieces as they discharge downwardly and also has a hand knob 127 to open it.

Secured to the front pieces 54 and 56 of the hopper section 44 is a half round channel-shaped air jet manifold 131 having a half annular-shaped front plate 132 that is connected by securing bolts 133 to half round member 131 and having a central half circular opening 134 through which access can be had to the central opening 57 at the bottom thereof to straighten out any disalignment within the hopper space 51 of the work cylinder elements.

Within the jet manifold 131 are three radially inwardly extending, partitions 136, 137 and 138, FIG. 7, dividing the half annular space into jet chambers from which the air under pressure can be blown from jet nozzles I, II, III and IV that will direct air under pressure toward the work cylinders at one end or the other thereof depending upon whether or not the closed end of the cylinder is at one side of the work feeder 68 or the other, as is determined from a sensing arrangement that will be described and will finally blow down the oriented work cylinder from the orientation chamber 108 into the delivery chute 21, with the present operation, the work cylinders 53 are to be tilted with their open ends down.

On the side wall 49 of the hopper section 44, is a microswitch 141 as best shown in FIGS. 2, 5 and 7 and located close to the forwardly extending guide projection 105 thereof but such as to be in axial alignment with the work cylinder feed bar 68 when the same is in a position overlying the top face of the transversely extending workpiece stop member 71 on top of the bottom orienting section 45 of the apparatus. This switch 141 has pivoted switch arm 142 that is engageable by a headed plunger 143 operable in a side hole 144 in wall 49 and operated by a pin 145. This pin 145 is carried in the bar 68 and can be projected from end hole 146 against action of a spring 147 normally pressing its flange 148 against an end shoulder 149 in a retracted position.

This cylinder feed bar 68 generally comprises an elongated casing 150 closed at its right end except for the pin hole 146 therein, while its left end has a large diameter open portion 151 communicating with its elongated work-receiving opening 152, FIG. 5, In the enlarged diameter space 151, is a flanged sensing pin 153 having a flange 154 stopped in its movement through a washer 155 toward a work cylinder 53 and against action of a spring 156 reacting between the pin flange 154 and washer 155 and normally holding the sensing pin 153 retracted with its flange 154 against a larger washer 157 fixed in large space 151 and retained by the end plate 103.

When the work cylinder piece 53 is present in the opening 152 in such a manner that its closed end is engaged by the axially adjustable sensing pin 153, as shown in FIG. 5, the cylinder 53 will have its open end thrust against the flange 148 of the spring pressed pin 145 so as to unseat its flange 148 from the shoulder 149 of the casing and cause the movement of the pin 145 into the side wall hole 144 to move outwardly headed plunger 143 to move the switch arm 142 outwardly to the dotted line position and close the switch 141.

If the work cylinder piece 53 is received in the opening 152 so that its opposite closed and open ends are reversed from the position shown in FIG. 5 the sensing pin 153 will merely enter the open end of the work cylinder piece 53 and there will be no axial displacement of the cylinder work element 53 or the closing of the micro-switch 141.

The feed bar closure plate 103 is secured to the open end of the bar casing 150 by fastening screws 158 and which also has an opening 159 therein to contain a small ball 161 that is adapted to engage the outer end of the sensing pin 153 and be engaged by the end of a piston rod 162 from a double acting air cylinder device 163 having air conduits 166 and 167 and secured by its end flange 168 and fastening screws 169 to the closure end plate 103 of the feed bar casing 150 and longitudinally movable therewith.

In this manner, the end to end position of the work cylinder 53 in the feeder bar 68 is determined, and so that the sequence of operation of the apparatus can be set up preparatory to the dropping of the cylinder piece 53 into the orienting space 108 to downwardly tilt the work cylinder piece 53 so that its open end will always proceed first in passing downwardly through the vertical delivery chute 21 for delivery over work-receiving posts 23. It is to be presumed for this description that the open end is to proceed first and by arranging the various control devices to be soon described the proper sequence of their operation for this result can be had, but it should be understood that the various control devices can also be adapted for delivery first of the closed end of the cylinder piece 53.

On the forward edge of the side wall 74 of the bottom section 45 is a front "on-off" door safety switch 171 mounted just above the spring latch 117 on the side wall 74. This door switch 171 is closed upon the door being closed upon it so that current can pass from supply wire 37 to line wire 34. This switch as will be seen from the wiring diagram of FIGS. 12 and 13 lies in the wire 37 and when closed allows current to pass from the main source 39 and through the main switch 41 and pilot lamp 43 will be turned on. This pilot lamp 43 can be located anywhere on the apparatus or moved therefrom and will indicate when the main switch 41 and the door switch 171 are closed and that the circuitry has been conditioned for use.

Referring now particularly to FIGS. 3, 6, 7 and 11, it will be noted that upon the rear face of the vertically extending front panel 73 of the bottom section 45 to which the front delivery guide members 106 and 107 are fixed to provide the orienting space 108 are right and left double acting air cylinders 172 and 173 connected thereto by their respective flanges and fastening screws. Extending from these respective air cylinders are retractable tilt pins 174 and 175 that are selectively thrust into the orienting space 108 at the opposite sides thereof by means to be described more in detail so as to cause the work cylinder 53 to be tilted downwardly from one or the other end, as in FIGS. 4 and 5 and depending upon whether or not the sensing pin 153 engages a closed end of the workpiece 53 or enters the free open end thereof, when the tilt pin 174 is extended and the cylinder 53 is dropped in the direction of the arrows so that its left end will tilt down and be led into the cylinder delivery chute 21 by its left end first, FIG. 4.

Upon the air cylinder 172 extending the tilt pin 174 there are also extended simultaneously downwardly and inwardly inclined and aligned flat stop guides 176 and 177 serving to arrest the tilting movement and direct the lower open end of the cylinder piece 53 toward the delivery chute 21 in the direction of the arrows. These respective guides 176 and 177 are respectively actuated by double acting air cylinder devices 178 and 179 respectively mounted on the rear face of the front wall 73 by Z-shaped brackets and fastening screws, as best seen in FIGS. 3 and 6. Slots are provided in the wall 73 through which the pin and stop guides are thrust.

If the cylinder piece 53 is to be tilted from the left or in the opposite direction from that illustrated in FIG. 4 and as shown in FIG. 7, the tilt pin 175 will have been extended into the orienting space 108 and the cylinder piece 53 swung downwardly from the right toward downwardly and inwardly inclined and aligned flat, stop guide bars 181 and 182 operated respectively for extension through slots in the wall 73 by double acting air cylinders 183 and 184 respectively mounted upon the rear face of the front wall 73 also by Z-shaped brackets and fastening screws.

As seen in FIG. 3, pairs of hose connections 186, 187 and 188 extend respectively from the double acting air cylinders 173, 183 and 184 to a distributing box 189 that has air extended to it by hose connections 191 and 192 extending out of the rear wall 72 from a slot 193 from over the bottom floor 79 and to a right cylinder solenoid-operated four-way valve 194, as seen in FIG. 11, that is connected to a hose 196 having a pressure regulating valve 197 to main air pressure distributing chamber 198. Each of the hose connections has a pressure regulating valve 199.

The left air cylinder devices 173, 183 and 184 for the tilt pin 175 and stop guides 181 and 182 are respectively connected by pairs of hose lines 201, 202 and 203 to air distributing box 204 that is in turn connected by hose lines 206 and 207 that extend downwardly and over the floor 79 of the section 45 and outwardly through the slot 193 in the wall 72 and connected as shown in FIG. 11 with a solenoid-operated four-way valve 208 that is in turn connected by a hose 209 through a valve regulator 211 with the main distributing chamber 198 all as shown in FIG. 11. Individual pressure regulators 212 are respectively provided in each of the hose lines 201, 202 and 203.

As seen in FIG. 1, hose lines 213 and 214 extend respectively from the nozzles I, III and combine with the hose lines 166 and 167 and extend rearwardly over the top of the bottom section 45 through and held in place thereover by a guard plate 216 that is fastened to the side wall 48 of the hopper device 44 and further passed downwardly along with hose connections 217 and 218 extended from the main feed bar work cylinder 92 and with hose lines 219 and 220 from the rear of the section and through a vertically extending channel section guard 217 secured to the rear wall 72 and join with other hose lines that have extended through slot 193 in rear wall 72. Hose lines 219 and 220 extend respectively from the air jet nozzles II and IV.

Also mounted upon the inner face of the front panel 73 at the bottom thereof, is a vertically extending bracket bar 221 secured at its inwardly bent upper and lower ends to the front panel 73 and serving to support vertically spaced upper and lower double acting air cylinders 222 and 223. The upper air cylinder 222 has hose lines 224 and the lower cylinder 223 has hose lines 225 and these lines all join with other hose lines and extend across the floor 79 of the bottom section 45 and outwardly through the slot 193 for connection with an air distribution box 226, along with hose lines 217 and 218 of feed bar cylinder 92, and in a manner as best shown in FIG. 11, and these air cylinders 222 and 223 are worked in unison with the main feed bar cylinder 92. The distributing box 226 is connected by two hose lines 229 and 231 to a solenoid-operated four-way valve 232 which is supplied with air from the main air distributing chamber 198 through a hose line 233 having a pressure regulator 234. All of the hose lines 217, 218, 224 and 225 have an individual fluid pressure regulator 235.

These upper and lower air cylinders 222 and 223 respectively have work stop pins 227 and 228 which work alternately, to first with the pin 227 being extended, to stop the downward movement of a work cylinder piece 53 and when retracted permit the cylinder to be lowered through the delivery chute for engagement with the lower pin 228 of the lower cylinder 223, then the pin 228 is retracted and work cylinder 53 is dropped from the chute on to an upstanding pin 23 on the rotary table 22 as this pin comes into direct vertical alignment with the delivery chute 21. The bottom stop pin 228 is retracted to drop the work cylinder 53 when the feed bar 68 is moved forwardly to deliver another work cylinder 53 to orientation space 108, there being now an oriented work cylinder 53 retained in the upper end of the delivery chute 21 by upper pin 227 for release next to the bottom pin 228. This upper pin 227 is retracted as the bottom pin 228 is again extended.

To assist the downward movement of the work cylinder 53 from above the upper pin 227, FIG. 6, there is provided an air jet 236 that delivers inwardly and downwardly and is simultaneously actuated with the retraction of the upper stop pin 227 so as to blow down the cylinder 53 on to the lower stop pin 228. As the lower stop pin 228 is retracted and in order to assist the downward movement and final discharge of the cylinder 53 an air jet 237 is simultaneously operated with retraction of the lower pin 228. As best seen in FIG. 11, air jet 236 is supplied by a hose line 238 with a pressure regulator 239 and connected to a solenoid-operated two-way valve 241 that is in turn connected by a hose 242 to the main air chamber 198. The lower air jet 237 is supplied by a hose line 243 with a pressure regulator 244 and connected to a solenoid-operated two-way valve 245 that is connected by hose 246 to main air supply chamber 198.

It should now be seen that the lower stop pin 228 is retracted to blow down a cylinder piece 53 onto a table pin 23, as the main cylinder 92 extends the feed bar 68 forwardly to discharge a cylinder 53 into the orienting chamber 108 and downwardly for engagement with the upper stop pin 227. The air nozzles of the half round manifold are used for turning and blowing down the workpiece 53 from the feed bar 68 in a manner to be fully described. By the use of air, proper timing and speed, without need of gravity, is provided in this apparatus.

The sequence of operation will be further explained upon viewing FIG. 11 which shows the various air cylinder and jet devices. Air is directed through hose line 233 from main air chamber 198 to four-way valve 232 upon this valve having been actuated to direct air either through a hose 229 or hose 231 to manifold 226. The hose line 217 extending from manifold 226 to the main feed bar cylinder 92 through an individual valve regulator 235 to deliver air to the feed bar cylinder 92 to actuate the feed bar 68 forwardly and through line 218 with regulator 235 to retract the feed bar 68. The upper air cylinder 222 that actuates the upper pin stop 227 has its hose connections 224 similarly connected to the manifold 226 for the cylinder 222 to be simultaneously extended and retracted therewith.

The lower pin stop cylinder 223 that has stop pin 228 to be extended into the delivery chute 21 has its hose connections 225 with pressure regulators 235 connected in a reverse manner to manifold 226 and valve 232 so that its stop pin 228 will be retracted when the feed bar cylinder 92 extends the feed bar 68 and the upper stop pin 227 is extended.

Wires 247 that operate the solenoid of the valve 232 are in parallel therewith wires 248 that in turn are connected to a solenoid-operated valve 245 that lies in a hose connection 246 connected to the elongated air distributing chamber 198 and leads through an air regulator 244 to final blow down jet 237 which will cause the cylinder element 53 to be ejected from the lower end of the chute and onto a rotary table pin 23.

The feed bar barrel load sensing device pin cylinder 163 has its hose connections 166 and 167 connected respectively through respective pressure regulators 249 and 251 with a solenoid-operated four-way valve 252 which is in turn connected by a hose 253 and a valve regulator 254 to the main distributing tube or chamber 198. This solenoid-operated valve 252 has wires 256 to operate the same and wires 257 of a solenoid-operated two-way valve 241 will cause to be operated simultaneously, the upper blow down jet 236 lying above the upper stop pin 227 through its hose connection 238 and valve regulator 239 with the two-way valve 241 for connection with the air distributing tube 198. As the work cylinder elements 53 are discharged from above the stop pin 228 a succeeding work cylinder 53 is dropped under pressure into the orienting chamber 108 so that its open end first drops downwardly from feed bar 68 and effected by the top air jets in manifold 131 lying above the orienting chamber 108 and in the manner to be now described and more in detail later, with the description being made of wiring diagram.

The top half round air jet manifold 131 has the four nozzles or jets, I, II, III and IV, angularly and evenly spaced from one another to direct air downwardly in sequence from two alternate jets, the jets being operated in pairs, as for example the air jets I and IV are used in sequence for blowing down the cylinder element 53 left side of the orienting chamber 108 as shown in FIG. 4, with first the air jet I operating and then later the air jet IV operating and as so as to position the cylinder element so that its open end extends downwardly, and the cylinder against inclined stop bars 176 and 177, the side feed bar micro-switch 141 not having been operated but the sensing pin 153 entering free end of cylinder 53 and causing cylinder 53 to have been tilted downwardly quickly over the right tilt pin 174 by blowing of left nozzle I. Air will have been delivered through hose 213 and its regulator 259 from solenoid-operated valve 261 connected by hose 262 with main air supply chamber 198. When the work cylinder 53 is in place against the stop bars 176 and 177 a micro-switch 263 and a light sensitive switch 264 will have been actuated that are connected to a solenoid-operated two-way valve 265 connected by a hose 266 with main air chamber 198 to deliver air through hose fluid regulator 267 hose line 220 to cause air to be blown down from nozzle IV to eject the work cylinder 53 from orientation chamber 108 into the upper end of delivery chute 21 and against upper stop pin 227.

If the sensing pin 153 engages the closed end of the cylinder element 53 and pushes the cylinder element against the feed bar flanged pin 145 so that the feed bar micro-switch 141 is closed, the blow down of the work cylinder 53 will be effected from the opposite direction as shown in FIG. 7 with the air jet II being actuated to blow from the right to the left to tilt the work cylinder 53 downwardly over the tilt pin 175 for engagement with the left stop bars 181 and 182 and the work cylinder 53 upon being blown down into the orienting chamber 108 and toward delivery chute 21. The closing of the feed bar switch 141 will have actuated the four-way valve 208 by supply of air from hose 209 and air chamber 198, FIG. 11, to distribute air from box 204 to the three air cylinders 173, 183 and 184 to thereby extend the tilt pin 175 and stop bars 181 and 182. Also, a solenoid-operated valve 268 supplied by a hose 269 from air chamber 198 to deliver air through a fluid regulator 270 in hose line 219 to the blow down nozzle II in the manifold 131.

As the guide bar 181 is extended a micro-switch 272 adjacent thereto is closed and light sensitive switch 273 in series therewith is closed by the work cylinder 53 passing thereover and a solenoid-actuated two-way valve 274 is energized to supply air under pressure to nozzle III from a hose line 275 leading from air chamber 198 through a fluid regulator 276 and hose line 214 to effect the blowing down of the work cylinder 53 into the upper end of delivery chute 21 and against upper stop pin 227 before blow down against lower stop pin 228 and final delivery.

The main elongated air chamber or tube 198 is supplied with air from a pipe 277 and an apparatus air pressure tank 278 having a pressure gauge 279 thereon and adapted to receive air under pressure from the factory air compressor indicated generally at 280 that supplies air to the various apparatus needing air under pressure and at different locations in the factory, FIG. 11. The present cylinder positioning apparatus not only has its own compressed air tank 278, but pipe coupling line 281 that can be connected to a main factory air supply line 282 of the factory air compressor 280, along with the other apparatus. The air received through the pipe coupling line 281 is passed through apparatus air filter 283, a one-way check valve 284, a fluid pressure regulator 285, and a lubricating chamber 286, all of which lying in piping 281 extending from the factory air line 282 to the present apparatus supply tank 278.

The general air compressor supply equipment 280 has the usual tank 287, an air compressor pump unit 288 at the top thereof that is operated by an electric motor 289 which receives electric current from an automatic control switch 291 and a plug cable 292, and responsive in its operation to the air pressure in the tank in order to keep a constant predetermined pressure supply therein. Extending upwardly from the main tank 287 is the main pipe line 282 which has a main shut off valve and regulator 293 and an air pressure gauge 294. The main air supply line 282 may have any number of air connection fittings 295 to which other factory apparatus can be connected.

A description will now be made to follow the sequence of operation of the movable parts of this apparatus with particular reference to the various micro-switches, some of which have already been mentioned, as to their particular location in the apparatus and other micro-switches and multiple switch time delay relays, not mentioned thus far, which are used at other locations, and their function explained. With reference to the wiring diagram shown in FIGS. 11 and 12, it will be seen that such equipment that is not shown attached to the machine can be placed in a separate control panel close thereto.

As the main switch 41 is closed and with the front door safety switch 171 being closed as when the transparent plastic door 112 is closed and secured by its spring latch 117 over the orientation chamber 108 and the delivery chute 21, current is delivered to the line wires 34 and 36 from electric current source 39 and is made available for the operation of the various micro-switches, time delay relays and solenoid-operated valves provided in this apparatus. The pilot lamp 43 will be lighted to indicate that the power is connected to the line wires 34 and 36.

As the starting switch 31 mounted upon the table support, FIG. 1, has its operating arm 32 engaged by an upstanding pin 23 upon the rotating work table 22, the normally open starting switch 31 is instantaneously closed. Intermediately the variable time delay relay 33 is energized to close a normally open switch 300, FIG. 11 that will cause a solenoid 232' of solenoid-operated four-way valve 232 by wires 247 to be energized that will cause the feed bar cylinder 92 to be extended with a work cylinder 53, the cylinder 222 with upper stop 227 extended and cylinder 223 with lower stop pin 228 retracted to discharge a cylinder 53. The bottom stop pin 228 is retracted instantly to discharge a work cylinder 53 from the lower end of the delivery chute 21 and onto a table pin 23. At the same time, solenoid 245' is energized to operate two-way jet valve 245 connected by wires 248 with wires 247 thereto so as to cause air to be ejected from nozzle 237 to assist the discharge of the work cylinder 53 from the delivery chute 21. This action is instantaneous and is such that the lower stop pin 228 will again be extended to receive again another cylinder element 53 as after a time delay, the feed bar 68 and upper chute stop pin 227 are retracted.

When the feeder bar 68 was in its retracted position and before being moved forwardly, a work cylinder 53 dropped into the work-receiving opening of the transverse feed bar 68 and upon the transversely extending stop block 71 and upon a cylinder or barrel load micro-switch 301 in the center of the block to close the same and with a feed bar rear micro-switch 302 having been closed with feed bar being in its rear retracted position, and with a normally closed relay switch 303 having been opened by the variable time delay relay 33 and with return of the relay after a time delay, FIG. 13, the switch 302 being closed and with these switches 301 and 302 being closed at the same time the side feed bar sensing cylinder device 163 will be operated as best shown in FIG. 5 to cause the sensing pin 153 to be thrust either into the open end of a work cylinder element 53 or against the closed end thereof. A solenoid 252' of sensing cylinder valve 252' and a solenoid 241' of upper air jet valve 241 are energized at this time to sense the position of the work cylinder in the feed bar 68 and blow down cylinder 53 from upper pin 227 to lower pin 228 for air jet 236 by wires 256 and 257.

If the micro-switch 141 will be actuated a latch relay coil 304 will in turn cause actuation of a six contact relay 305 to cause various contacts thereof to be opened while other contacts are closed and to positions shown in FIG. 13. This relay 305 also has a latch release coil 306 that will be actuated when the feed bar upper plate 59 is retracted to its near rear position and upon a depending projection 307' engaging latch release coil micro-switch 307 on hopper wall 49, FIGS. 2 and 6, to cause the latch relay 305 to be reset and returned to its original switch contact position shown in FIG. 12.

This latch relay 305 determines the actuation of the air feeds and the cylinder devices and guides that have to be closed either at the right of the orientation chamber 108 or at the left of the orienting chamber and determine the end of the work cylinder element 53 that should first fall. In as much as the cylinder element 53 has to be positioned on to the table pin, the open end of the cylinder element 53 has to first fall before the closed end falls.

If the feed bar sensing micro-switch 141 is not actuated the relay 305 will remain in the position as shown in FIG. 12 and the latch release micro-switch 307 will have been effective to operate latch release coil 306 and relay switch 308 will be normally closed for current to pass through wires 308', right cylinder guides solenoid 194' or valve 194, FIG. 11, will have been energized since the sensing pin 153 will have entered freely the open end of the cylinder 53 rather than engaging the closed end as shown in FIG. 5. The solenoid-operated valve 194 will be operated so that all of the right cylinder operating devices 172, 176 and 178 and their pin 174 and guide bars 176 and 177 will be thrust forwardly as shown in FIGS. 1, 4 and 6.

When the sensing pin 153 by engagement with the closed end of work cylinder 53 as shown in FIG. 5, the feed bar switch 141 will have been actuated and the relay 305 would have been operated to close a micro-switch 309 for current to pass through wires 309' to energize solenoid 208' of solenoid-operated valve 208 of the left stop pin and bar cylinders 173, 183 and 184, pin 175 and guide stop bars 181 and 182 will have to be thrust forward so that the cylinder piece 53 will fall as shown in FIG. 7, from the right with its open end down.

The air feed blow down jet nozzles I and IV are not activated unless the feed bar is in a complete forward position to close a double pole micro-switch 310 provided upon the hopper incline plate 52 at the bottom face thereof and engaged by an upstanding projection 310' on feed bar top plate 59 and closed thereby on its forward movement. Under the condition where there has been no actuation as shown in the diagram of FIG. 12 of the relay 305 with relay switch 311 being closed and likewise a relay switch 312 of an air nozzle transfer latch relay 313, air feed solenoid coil 261' of valve 261 by wires 314 will be energized causing air to be blown from nozzle I so as to blow downwardly the left end of the cylinder 53, FIG. 4, to be tilted over a tilt pin 174 to make inclined engagement by the side of the cylinder element with the stop bars 176 and 177.

As soon as this is done, transfer of air to nozzle IV, which is extended at a different angle, must be made to effect blow down of the work cylinder 53 from the chamber 108 into chute 21 and against stop pin 227. A normally closed switch 315 of relay 305 lies in circuit relation with a solenoid 265' and feed by wires 316 and a normally open switch 317 of relay 313. The inclined stop guide bar 176 on having actuated micro-switch 263 and the cylinder element 53 having crossed the path of light sensitive switch device 264 to close the same, latch relay solenoid 318 of latch relay 313 will have been energized to open nozzle relay switch 312 and to close relay switch 317 and effect the energization of valve solenoid 265' thereby to cause transfer of air to nozzle IV and the blow down of the work cylinder piece 53 into the delivery chute 21 and against the upper stop pin 227, and in doing so, the cylinder 53 will have passed light beam sensitive switch device 319 which will in turn energize a latch release coil 321 of the air transfer latch relay 313 and to thereby reset the relay 313 to its normal position for another orientation of a work cylinder piece 53 in the orientation chamber 108.

If the next cylinder piece 53 is aligned as has been aligned the previously discussed cylinder piece so that the pin 153 will enter the open end of the cylinder, the same switches and operation will be effected and the cylinder piece will be oriented in the same manner against the right-hand cylinder pin and guides.

If on the other hand, the feed bar sensor pin 153 engages with a closed end of the work cylinder piece 53 as shown in FIG. 5 and the open end of the cylinder piece 53 will be pressed against the flanged pin 145, the micro-switch 141 will be closed so that relay solenoid 304 of main relay 305 will be energized to work the relay 305 so that the relay switch 309 is closed and solenoid 208' will be energized to operate the valve 208 for air to thrust outwardly the left-hand pin and bar guides 175, 181 and 182. Electric current will be passed through lower contact arm 310' of the double switch and main relay switch 323, micro-switch 310 being operable by upper feed plate 59 in hopper 51, FIG. 6, and through wires 322 to energize a solenoid 268' of valve 268 and through a then normally closed air transfer relay switch 324 of relay 313, FIG. 12 and air will have been forced from nozzle II on to the right open end of the cylinder element 53 causing the same to be tilted downwardly to the left over pin 175 and against bars 181 and 182. The left guide bar 181 upon being extended will have closed micro-switch 272 and light sensitive switch 273 having been closed by the work cylinder 53 stopped against bar guides 181 and 182 and air transfer relay solenoid 318 will again be energized to open relay switch arm 324 and close air transfer relay switch arm 325, and with a main relay switch 326, FIG. 13, having been closed, and through wires 327, jet solenoid 274' of valve 274 leading to nozzle III will be operated to cause the downward thrust of the cylinder element 53 into the delivery chute 21 against stop pin 227 to close the switch 319 and energize latch release coil 321 of the air transfer relay 313 whereby to complete the air jet sequence for the delivery of a cylinder element 53 against the left orientation guide members and downwardly into the delivery chute 21 and against the upper stop pin 227. In this manner all of the cylinder elements 53 are delivered with their open ends downwardly so as to be placed on the pins 23 of the rotating table 22.

It should be apparent that this rotating table 22 with the pins 23 thereon is continued to rotate as shown in FIGS. 8 and 9 and turned past an engraving device which is spring pressed against the work cylinder 53 while resting on the pins 23 and by rotation roll and engrave the work cylinders 53. When the engraved cylinder elements reach air chute ejecting station B, it will be blown upwardly and fall into a discharge chute.

The light sensitive switch devices 264, 273 and 319 are respectively mounted at their different locations on the rear face of the front wall 73 of the bottom section 45 and are similarly constructed as best shown in FIG. 10. Each device has a mounting bracket 330 that is secured by fastening screws 331 to the rear surface of the front wall 73. This bracket 330 extends rearwardly from the wall 73 and has secured to its end a lamp 332 from the rear of which a cable 333 extends. A holder 334 secured to bracket 330 by screws 334' has the lamp 332 and a sensing element 335 therein. Extending forwardly from the lamp 330 are light transmitting fibers 336 confined in a forwardly extending light projecting and receiving nose housing 337 that extends through a hole 338 at the location on the front wall 73 and so as to transmit an annular light beam into the path of travel of a cylinder element 53 either in orientation chamber 108 or delivery chute 21 as indicated at 339 for engagement with a reflecting surface 340 provided upon the inner face of the transparent door 112 and which returns or reflects a light beam 341 to light receiving central fibers 342 that will transmit return light to the light sensing element 335 in the holder 334 on the rear of the mounting bracket 330. The sensing element 335 upon receipt of the light beam becomes capable of closing or opening an electric circuit which in turn will cause electric solenoids to be energized or deenergized for effecting the operation of the various blow down air jets.

All of the various solenoid-operated valves relays and micro-switches can be located on panels affixed to the apparatus or disposed in close proximity thereto and while the apparatus itself will be mounted on the work performing machine and over its rotating table 22 being supplied with the cylinder elements as shown in the FIG. 1 or can be supported on its own bracket separate and apart therefrom. The panels for the apparatus for holding the wiring, the relays, timers can be on one panel and another panel can hold the air distributing box and air valves with the solenoids with the various pressure regulating valves available adjusting the air supply to the proper air pressure for best operation of the cylinder positioning and feed aparatus.

While much of the control has been effected through solenoid-operated valves, and air-operated cylinders, it should be apparent that the control could be effected directly through electric solenoids with automatic programming to effect the timing and sequence controls and that only air would be needed for the blow down operations. Furthermore, pneumatic and/or fluidic controls could be adapted to replace the presented electrical components. It has been estimated that this apparatus by the use of air for effecting a blow down operation upon the assumed elements or pieces that feeding of these pieces can be made at a rate which is much greater than if dependency were made only upon gravity feeding. These pieces are oriented or positioned and are delivered to the work machine in a desired manner so that work may be performed upon them.

While various changes may be made in the detailed construction of this invention, it shall be understood that such changes shall be within the spirit and scope of the present invention as defined by the appended claims.

What is claimed is:

1. A cylinder positioner comprising a hopper section having a top hopper opening and a laterally operable feeder bar for receiving the work cylinder element and delivering the same while lying transversely in the feeding bar to a position laterally removed from the bottom of the hopper opening, an orienting section having a front wall with an orienting chamber of generally funnel shape permitting the downwardly tilting of a cylinder element from a transversely extending position to a vertically extending position, left and right guide members adapted to be thrust into the orienting chamber and sensing means on the hopper feeding bar responsive to the cylinder element when in the feeding bar to locate either the right or the left cylinder guide members for receiving the cylinder element and depending upon the end of the work cylinder to be tilted down in advance of the other end, a delivery chute leading downwardly from the orienting space through which the cylinder elements are passed and means operable responsive to the movement of the hopper feeding bar for controlling the flow of cylinder elements into and out of the delivery chute.

2. A cylinder positioner as defined in claim 1 and said cylinder sensing means for controlling the dropping of the cylinder elements from the feed bar either by one or the other end and including a sensing pin adapted to enter free an open end of the work cylinder element or engage with the closed end of the work cylinder and micro-switch pin means at the opposite side of the feeder bar and operable upon the sensing pin engaging the closed end of the cylinder element to operate the switch and effect the extension of the selected cylinder guide means into the orienting chamber.

3. A cylinder positioner as defined in claim 1, and air blow down means vertically overlying the orienting space of the bottom section and having air jet nozzles angled from one another and adapted to blow air under pressure on to the cylinder element to blow the same out of the feeder bar member into the orienting space of the bottom section and against the selected extended guide members therewithin, means responsive to the feeder bar sensing means to effect the selection of the blowing of one nozzle or the other, said nozzles being located at opposite sides of the feeder bar.

4. A cylinder positioner as defined in claim 3, and said air blow down means comprising a half round supporting member and four nozzles extended into the half round member and peripherally spaced from one another therearound, said nozzles being operable in pairs and one of each pair operated before the other, said feeder bar sensing means effecting the actuation of the nozzles being adapted to select one pair of nozzles at one time and another pair of nozzles at another time for actuation, one of the nozzles of each pair being operable to effect the tilt and blow down of the cylinder elements on to the selected right or left hand guide members within the orienting space and the other nozzle being operable to blow the oriented cylinder into the delivery chute.

5. A cylinder positioner as defined in claim 3, and a retractable stop pin means in the vertical delivery chute for stopping the passage of the cylinder upon being blown thereinto from the orienting chamber, a further sensing means in the delivery chute sensing the presence of the work cylinder therewithin and engagement of the cylinder with the retractable pin and operable with the actuation of the feed bar to effect the actuation thereof and blow down air jet means in the top of the vertical delivery chute for effecting the movement of the cylinder downwardly through the vertical delivery chute upon retraction of the stop pin thereof.

6. A cylinder positioner as defined in claim 5, and a further retractable stop pin means at the lower end of the vertical delivery chute, air jet means lying thereabove and means automatically operable with the retraction of the bottom stop pin to operate the blow down air jet means and effect under air pressure the final ejection of the cylinder element therefrom.

7. A cylinder positioner as defined in claim 6 and a safety door hingedly connected to the bottom section of the positioner at the lower end of the vertical delivery chute said door providing a wall of the vertical delivery chute and being spring biased to a closed position and automatically operable upon jamming of a cylinder element in the discharge end of the vertical delivery chute to permit the ejection of a cylinder element therefrom to free the delivery chute of a cylinder element.

8. A cylinder positioner, as defined in claim 7 and a front transparent door hinged at one side of the bottom section of the positioner and adapted when closed to overlie the orienting chamber and the vertical delivery chute to observe therethrough the passage of the cylinder elements and to provide a front wall therefor, switch means engageable by the closed door and included in the circuitry of the positioner to render inoperable the positioner when the door is not closed and catch means for holding the door in a closed position over said switch means.

9. A cylinder positioner, as defined in claim 8, and light sensing devices disposed in the front wall of the bottom section, two of which lying within the orienting space to sense the position of the cylinder element therewithin and the other of said sensing devices lying within the vertical delivery chute above the upper stop pin, said sensing devices emitting a light beam and said front door having reflecting surfaces thereon for returning the light beam to the sensing device, the opening of said door serving to render ineffective the light beam sensor devices, said sensing devices having circuitry included in the means for effecting the blow down of the nozzle devices from the orienting chamber and into the delivery chute.

10. A cylinder positioner, as defined in claim 1 and said feed bar having a slotted opening extending transversely thereof and adapted to be aligned with the lower end of the hopper, a transverse stop bar underlying the feeder and the hopper serving when the feeder bar is retracted to stop downward movement of the cylinder element into the feeder bar opening and said transverse stop bar having a switch operable by the cylinder element upon being dropped thereon and serving to control the actuation of the feed bar with the cylinder therein and effective to effect actuation of the side feed bar sensing means.

* * * * *